Dec. 1, 1970 — H. J. GIRARD — 3,543,323
FOAMED PLASTIC PIG FOR PIPE LINES
Filed Nov. 20, 1968
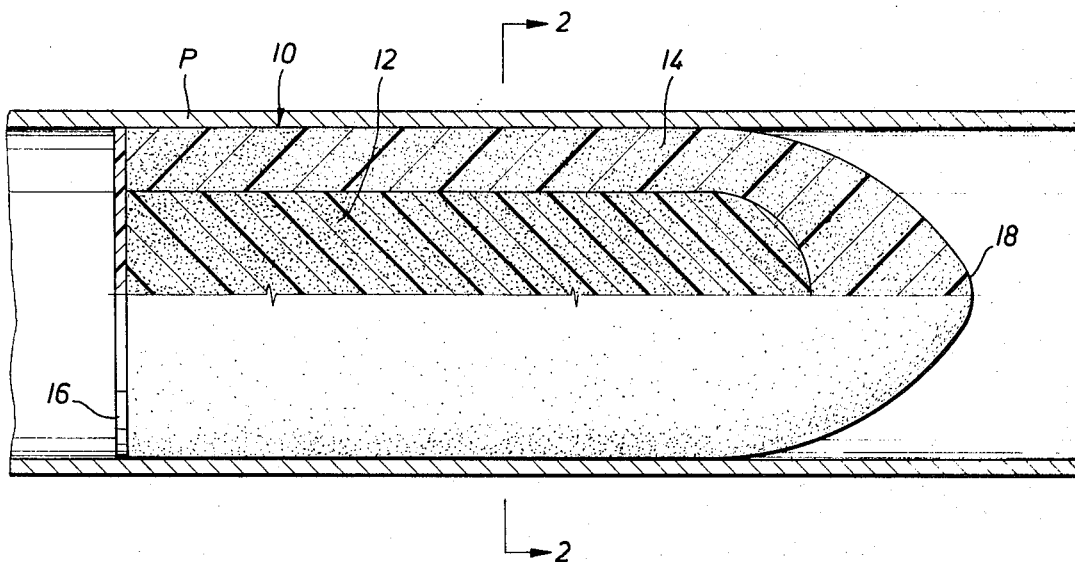
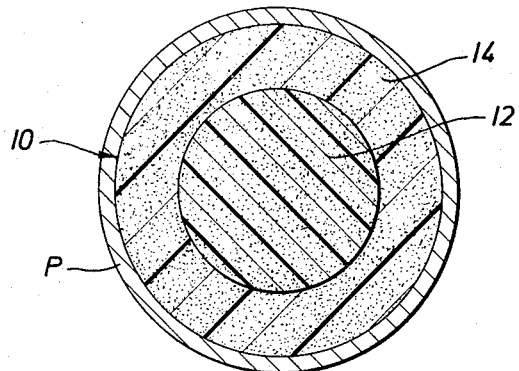
Harry J. Girard
INVENTOR
BY Charles E. Lightfoot
ATTORNEY United States Patent Office 3,543,323
Patented Dec. 1, 1970

1

3,543,323
FOAMED PLASTIC PIG FOR PIPE LINES
Harry J. Girard, 3202 Huntingdon, Houston, Tex. 77019
Filed Nov. 20, 1968, Ser. No. 777,449
Int. Cl. B08b 9/04
U.S. Cl. 15—104.06
6 Claims

ABSTRACT OF THE DISCLOSURE

A pipe line pig formed of foamed plastic adapted to be propelled through a pipe line by a pressure gradient therein. The pig has a central core formed of relatively soft foamed plastic and an outer shell formed of relatively dense, tough foamed plastic resistant to wear and tear. The entire body of the pig is of sponge-like character capable of being penetrated by fluid in the pipe line and the body has a barrier layer at one end closing the body to the flow of fluid therethrough and which forms a fluid tight seal with the internal surface of the surrounding pipe to prevent the flow of fluid past the pig. Due to the flexible and compressible character of the pig it may pass readily through restrictions or misshapen portions and about bends in the pipe line while remaining in sealing contact therewith.

BACKGROUND OF THE INVENTION

In the operation and maintenance of pipe lines it is customary to clean such lines by inserting a pig or swipe therein which is propelled through the line by a pressure gradient therein. Such pigs are commonly made of resilient material, such as rubber, foamed plastic, or the like, of a size to be inserted into the line in fluid sealing engagement with the surrounding internal surface of the pipe, and designed to pass readily about bends and through restrictions or misshapen portions of the line without loss of sealing contact.

Heretofore, such pigs or swipes, when formed of foamed plastics have been subject to rapid wear and to tearing due to contact with roughness of the internal surface of the pipe, internal projections formed therein by weld deposits, and the like, so that the pigs soon become unsuitable for use and at times are substantially disintegrated.

Various ways of overcoming these difficulties, and producing a more durable, yet suitably flexible pig, have been proposed, such as by providing the pig with a coating of more durable, unfoamed plastic. When thus constructed, however, the body of the pig is closed to penetration by fluids in the line and when subjected to the high pressures of such fluids the pigs are compressed to a smaller diameter than that of the pipe, thus allowing leakage past the pig. At times such pigs are compressed and deformed to an extent that they are misshapen or puckered permanently rendering them completely unfit for further use.

The present invention has for an important object the provision of a pipe line pig which is formed of easily penetrated, sponge-like material such as foamed plastic designed to prevent shrinkage or reduction in diameter when subjected to fluid pressure in the pipe line, yet having ample resilience and flexibility to readily pass about bends and through misshapen portions of the line.

Another object of the invention is to provide a pipe line pig which is substantially completely formed of foamed plastic material of sponge-like character, but which has sufficient durability to resist wear and tear due to contact with roughness or internal projections in the pipe.

A further object of the invention is the provision of a pipe line pig comprising an elongated, generally cylindrical, sponge-like body, having a central core or inner part formed of relatively soft easily compressed foamed plastic, such as polyurethane, and an outer shell surrounding the core and formed of a harder, more durable and substantially denser sponge-like foamed plastic, the body being closed at one end against the flow of fluid therethrough by a barrier layer or cover positioned for sealing engagement with the surrounding internal surface of the pipe to prevent the flow of fluid therein past the pig.

SUMMARY OF THE INVENTION

Briefly described, the pipe line pig of the invention comprises a generally cylindrical, bullet shaped body formed of sponge-like foamed plastic having an inner, central, core portion formed of relatively soft, low density plastic foam and an outer shell or layer of relatively hard, durable, high density plastic foam, surrounding the core. The body has at one end an external layer or cover of unfoamed plastic forming a barrier to prevent the flow of fluid through the body and which is positioned for sealing engagement with the surrounding internal surface of the pipe to prevent fluid from flowing past the pig. The pig, thus formed has sufficient flexibility and compressibility to readily pass through restricted or misshapen portions of the line and about bends therein while maintaining sealing engagement with the pipe, and sufficient durability to resist wear and tear due to contact with roughened areas or internal projections in the pipe such as may be caused by weld deposits.

Due to the sponge-like character of the body fluid under pressure in the pipe at one end of the pig may readily penetrate the body so that the body is not reduced in diameter by the pressure of fluid exerted thereon, while the barrier permits the pig to be propelled through the line by the pressure gradient in the line.

BRIEF DESCRIPTION OF THE VIEWS OF THE DRAWINGS

FIG. 1 is a side elevational view, partly broken away, and partly in cross-section, of a preferred embodiment of the invention, showing the pig or swipe in use in a pipe line; and FIG. 2 is a cross-sectional view, taken along the line 2—2 of FIG. 1, looking in the direction indicated by the arrows.

DETAILED DESCRIPTION OF A PARTICULAR EMBODIMENT OF THE INVENTION

The pipe line pig of the invention comprises an elongated, generally cylindrical, preferably more or less bullet-shaped body, generally designated 10, formed of suitable material, such as foamed plastic, such as polyurethane. The body is formed with a central inner or core portion 12 of the same general shape as the external shape of the body and formed of relatively soft, sponge-like, foamed plastic, and an outer shell or casing portion 14 of relatively hard, sponge-like, foamed plastic.

The inner and outer portions of the body may conveniently be formed of foamed polyurethane, wherein different amounts of foam producing and curing agents are incorporated in a well known manner, so that the inner core will be of easily compressible character, while the outer shell or casing will be of more durable, but still flexible and more or less sponge-like nature. The core may, for example, be formed of foamed plastic having a density of from about one to about ten pounds per cubic foot, while the outer covering or shell may be of density of from about 20 to about 40 pounds per cubic foot.

The inner core and outer shell may be of any suitable thickness to provide a tough and durable, but easily compressible and flexible body, capable of readily passing about bends in the pipe line or through irregularly shaped portions thereof, and which is resistant to tearing or wear due to contact with internal roughness, jagged edges, inwardly projecting weld deposits, or the like, in the line. The pig, thus formed is substantially entirely of open-textured, sponge-like character, which is readily penetrated by fluid.

At its rear end the body is provided with a barrier layer 16, of suitable material, such as unfoamed plastic positioned to close the body against the passage therethrough of fluid in the pipe line and to form a fluid tight seal with the surrounding internal surface of the pipe to prevent fluid from flowing past the pig therein.

The body is preferably of somewhat larger external diameter than the internal diameter of the pipe line in which it is to be used, so that the pig will have a tight fit when inserted in the pipe.

The inner core and outer shell may, of course, be formed of other suitable materials, such as foamed plastics of different types, to provide a body of sponge-like character throughout which may be more or less completely penetrated by the fluid in the pipe, so that the pressure of the fluid will not reduce the size of the body, which will be expanded into tight engagement with the surrounding internal surface of the pipe by the longitudinal compressive force exerted by the fluids in advance of and behind the pig during its movement through the line.

The body is preferably formed with a rounded nose portion 18 at one end to allow the pig to be readily inserted into a pipe line.

In making use of the invention the pig is inserted into a pipe line in the manner illustrated in FIG. 1, whereupon the pig may be propelled through the line by a pressure gradient therein. It will be apparent that fluid in the line in advance of the pig may readily penetrate the sponge-like body so that the pig is not reduced in diameter by the pressure of the fluid, while the pressure of fluid rearwardly of the pig will tend to compress the body longitudinally and move the pig forwardly through the line.

It will thus be seen that the invention provides a pipe line pig which is of durable construction, capable of being subjected to high fluid pressure without reduction in diameter and which has sufficient flexibility and resilience to pass readily through bends or misshapen portions of the pipe line.

The invention is disclosed herein in connection with a particular embodiment of the same, which is intended by way of illustration only, it being evident that various modifications can be made of the same within the spirit of the invention and the scope of the appended claims.

Having thus clearly shown and described the invention, what is claimed as new and desired to secure by Letters Patent is:

1. In a pipe line pig adapted to be propelled through a pipe by a pressure gradient
    a cylindrical body formed of sponge-like material having a central core formed of soft, flexible foamed plastic and a covering for said core extending continuously about the periphery of the body and formed of foamed plastic which is of harder and more durable character than said core.

2. The pipe line pig as claimed in claim 1, including additionally a layer of flexible, impervious material covering one end of said body.

3. The pipe line pig as claimed in claim 2 wherein said impervious layer is positioned for sealing engagement with the surrounding wall of a pipe to prevent the flow of fluid in the pipe line past said body.

4. The pipe line pig as claimed in claim 2, wherein said body has an open-textured surface from said layer to the other end of the body and exposed to pressure of fluid in the pipe line beyond said other end.

5. The pipe line pig as claimed in claim 1 wherein said body is substantially completely of open-textured material readily penetrated by fluids.

6. The pipe line pig as claimed in claim 1, wherein said core and said covering are formed of foamed polyurethane.

References Cited

UNITED STATES PATENTS

| | | | |
|---|---|---|---|
| 2,906,650 | 9/1959 | Wheaton | 15—104.06 |
| 3,011,197 | 12/1961 | Nehse et al. | 15—104.06 |

EDWARD L. ROBERTS, Primary Examiner